United States Patent Office

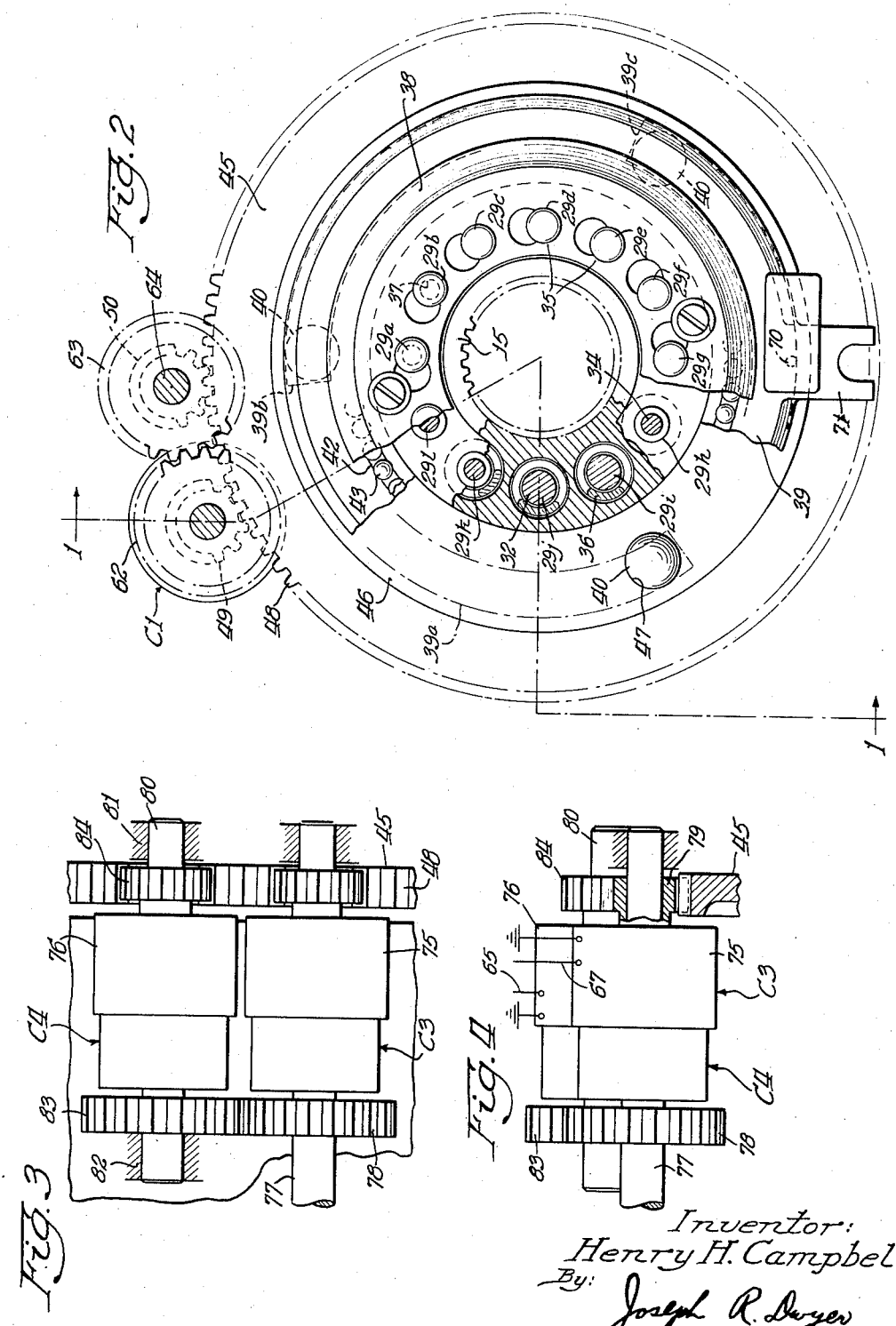

2,853,166
Patented Sept. 23, 1958

2,853,166

SOLENOID-OPERATED CLUTCH

Henry H. Campbell, East Cleveland, Ohio, assignor to Borg-Warner Corporation, Chicago, Ill., a corporation of Illinois Application September 11, 1956, Serial No. 609,304

12 Claims. (Cl. 192—35)

This application relates to clutches and more particularly to clutches of the multiple disc type capable of transmitting high work loads.

The clutch forming the subject matter of my invention is so constructed and arranged to be initially slippingly engaged, so as to provide an initial slipping connection between a drive and driven shaft, thereby preventing the high torque of the drive shaft from adversely affecting and perhaps injurying or destroying the driven mechanism associated with the driven shaft and the clutch. To accomplish this, there are provided a plurality of engaging elements in the form of plungers, operatively connected to one set of the clutch plates, and which are engageable with force transmitting plate element associated with the clutch discs in a predetermined sequence, for example, one after the other, or one pair after another pair. Moreover, the engagement and disengagement of the clutch is under the operation of electrical means, for example, solenoid-operated auxiliary clutch means.

Therefore, the principal object of my invention is the provision of an improved multiple disc clutch.

Another object of my invention is the provision of an improved multiple disc clutch so constructed and arranged to be initially slippingly engaged.

A still further object of my invention is the provision of an improved multiple disc clutch having a plurality of engaging elements, such as plungers, associated therewith adapted to be operated in a predetermined sequence to cause an initial slippingly engagement of the clutch.

A still further object of my invention is the provision of an improved multiple disc clutch adapted to transmit high values of work between a drive and driven shaft without injury to the driven mechanism upon engagement.

Another and still further object of my invention is the provision of an improved multiple disc clutch operated by means of electrically operated auxiliary clutch means.

These and other objects and features of my invention will become apparent from the following description when taken with the accompanying drawings, in which;

Figure 2 is a sectional view taken on line 2—2 of Figure 1;

Figure 3 is a partial plan view illustrating a second embodiment of my invention; and Figure 4 is a side view of the structure illustrated in Figure 3.

*Detailed description*

Figure 1:
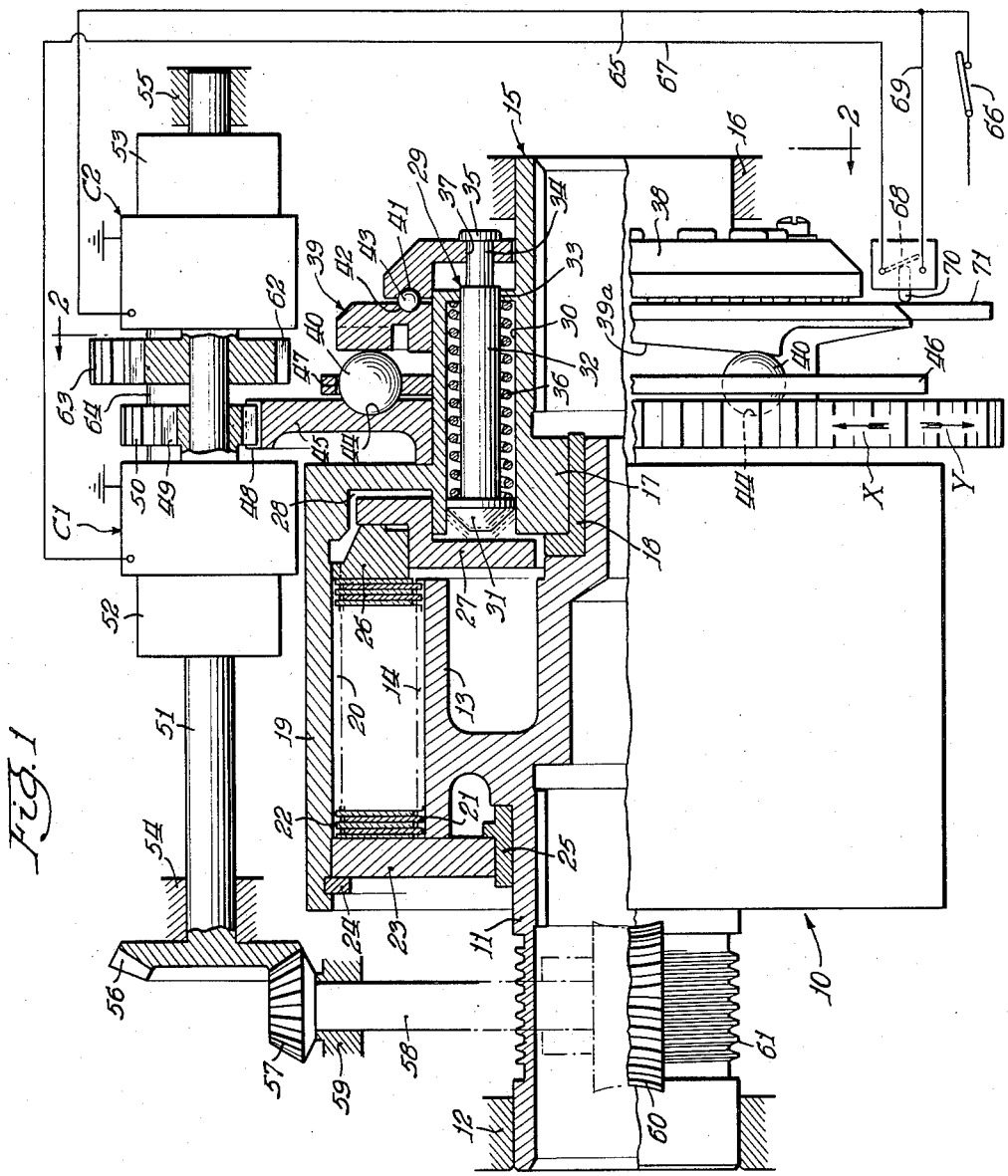
Figure 1 is a partial cross-sectional view taken on line 1—1 of Figure 2 illustrating one embodiment of my invention.

Referring now to the drawings, and in particular to the first embodiment of my invention, as illustrated in Figures 1 and 2, there is illustrated a multiple disc clutch, generally indicated at 10, which comprises a substantially cylindrical drive member 11, suitably supported for rotation in a bearing element 12 and adapted to receive, for conjoint rotation therewith, as by a splined connection (not shown) a drive shaft (not shown) from a suitable source of power (not shown). The member 11 is formed with an enlarged cylindrical portion 13 having splines 14 thereon to receive driving clutch plates later to be described.

A substantially cylindrical driven member 15 is provided, suitably supported for rotation in a bearing element 16, and is adapted to receive, for conjoint rotation therewith, as by a splined connection (not shown), a driven shaft (not shown) connected to a mechanism to be driven.

The member 15 is provided with a portion 17 which surrounds one end of the member 11 and a bearing member 18 is interposed therebetween, so as to provide bearing surfaces when the members 11 and 15 are rotated relative to each other. The member 15 is also provided with an enlarged cylindrical portion 19 having splines 20 therein to receive driven clutch plates later to be described. As will be obvious, the portion 19 is disposed over and outwardly of the portion 13.

The splines 14 and 20 receive interleaved drive and driven clutch plates 21 and 22, respectively, which are adapted to be packed together in frictional engagement to transmit rotation between the shafts. The plates 21 and 22 are adapted to be packed, when the clutch 10 is engaged, against an annular member 23 retained within the portion 19 by means of a snap-ring 24 and rotatable on a bearing element 25 surrounding the member 11.

In order to pack the plates 21 and 22 together, there is provided a clutch ring 26, disposed at the opposite end of the plates from the member 23, and movable by means of a force transmitting plate 27. The plate 27, because of its configuration, as illustrated, is retained in operating position within an annular cavity 28 in the member 15.

To provide the engaging force on the plate 27, a plurality of engaging members in the form of plungers 29 are provided; twelve of these plungers being indicated in Figure 2. For purposes of facilitating description these plungers will be identified as 29a, 29b, 29c, 29d, 29e, 29f, 29g, 29h, 29i, 29j, 29k, 29l. While twelve plungers are shown, a greater or lesser number may be provided without departing from the spirit of my invention.

Each plunger 29 is received in an open-ended bore 30 in the member 15, and comprises an elongated element having a truncated conical portion 31, an elongated reduced diameter stem portion 32 passing through a complementary sized opening 33 coaxial with, and smaller in diameter than the bore 30 in the member 15, another reduced diameter portion 34, and an end button-like portion 35. A coil spring 36 surrounds the stem portion 32 and is disposed between the portion 31 and the shoulder defined by the bore 30 and the opening 33 to resiliently urge the plunger to the position wherein it engages the plate 27 upon engagement of the clutch 10. The portions 32 of plungers 29a and and 29g are the longest; the portions 32 of plungers 29b and 29h are slightly shorter; and the portion 32 of plungers 29c, 29d, 29e, 29f, 29i, 29j, 29k and 29l are still slightly shorter than those previously described. This construction of the plungers 29 insures a slipping engagement of the clutch, as will be later described.

The portions 34 of the plungers 29 pass through complementary sized openings 37 in an annular dish-shaped plunger plate 38 mounted for axial movement with respect to the member 15. The plate 38, as will be obvious, will always rotate with the member 15 because of its association with the plungers 29. The plate 38 is resiliently urged toward the left (as viewed in the drawings) by means of the coil springs 36 acting against the portions 31 of the plungers and due to the button-like portions 35 engaging the plate 38.

A cam plate 39 is disposed around the member 15 for axial movement relative thereto, but is restrained against rotation in a manner to be described. The cam plate 39 is provided with cam surfaces or faces 39a, 39b, and 39c equally spaced around one of its faces for cooperation with an equal number of balls 40, to be described.

For providing bearing means between the plunger plate 38 and the cam plate 39 to allow the plate 39 to rotate relative to the plate 39, each plate 38 and 39 is provided with an annular raceway 41, 42, respectively, to receive therein a plurality of ball bearings 43.

The balls 40, previously referred to, run in an annular groove 44 formed in a thrust plate 45 and are retained in proper spaced relationship therein by means of a retainer ring 46 having spaced openings 47 therethrough in which the balls 40 are disposed. The thrust plate 45 is rotatably disposed about the member 15 and is provided with peripheral gear teeth 48 meshing with spaced pinions 49 and 50.

The pinion 49 is rotatably disposed on a shaft 51 passing through spaced housings 52 and 53 and supported at its extremities in bearing means 54 and 55. Adjacent the bearing 54, the shaft 51 is formed with or has attached thereto, a bevel gear 56 meshing with a bevel pinion 57 formed on or attached to a vertically disposed shaft 58 supported in bearing means 59. At the opposite end of the shaft 58, there is disposed thereon a worm gear 60 meshing with a worm portion 61 of the member 11.

Also rotatably disposed on the shaft 51 is a gear 62 which meshes with a gear 63 fixed to a suitably supported shaft 64 to which the pinion 50 is fixed. The shaft 64 may be, and usually is, journalled in suitable, conventional, bearing means (not shown).

The housings 52 and 53 enclose electrically operated solenoid clutches of any conventional design, the solenoid clutches being identified for purposes of description (but not shown in detail) as C1 and C2, respectively.

The clutch C1 is adapted to be clutched when its solenoid is energized, so that the pinion 49 will be clutched to, or connected for rotation with, the shaft 51. The clutch C2 is adapted to be declutched when its solenoid is energized, so that the pinion 50 will be then clutched to, or connected for rotation with, the shaft 51.

To energize the solenoids, there is provided an electrical system which includes a line or lead 65 connected to a suitable source of electrical power and also connected to the solenoid associated with the clutch C2, the line or lead 65 having a series connected switch 66 therein. The solenoid associated with the clutch C1 has connected thereto a line or lead 67 connected to one terminal of a switch 68. The other terminal of the switch 68 is connected to the line or lead 65 by means of a line or lead 69. The switch 68 is therefore connected in parallel with the line or lead 65. To complete the solenoid electrical circuits, each of the solenoids is grounded, as illustrated.

The switch 66 is actuated by hand; the switch 68 is a microswitch and adapted to be actuated by plunger means 70 contacting a protruding portion 71 of the cam plate 39 which is adapted to restrain the cam plate against rotation, but allow axial movement thereof. Movement to the left of the cam plate 39 will tend to close the switch 68; movement to the right will tend to open the switch 68.

Referring now to Figures 3 and 4, illustrating the second embodiment of my invention, it will be noted that the only difference is in the arrangement of the solenoid operated clutches relative to the clutch 10.

There is illustrated housings 75 and 76, corresponding to housings 52 and 53, respectively of Figures 1 and 2, which enclose solenoid operated clutches C3 and C4, corresponding to clutches C1 and C2, respectively of Figures 1 and 2.

A shaft 77 passes through the housing 75 and is provided with a bevel gear, as is shaft 51 and is supported in a similar manner. A gear 78 is fixed to the shaft 77 adjacent one of the ends of housing 75 and a pinion 79 is rotatably disposed on the shaft 77 adjacent the opposite end of the housing 75. The pinion 79, as is illustrated, meshes with the teeth formed on the periphery of the plate 45.

A shaft 80 passes through the housing 76 and is suitably journaled in bearing means 81 and 82. A gear 83 is fixed to the shaft 80 adjacent one end of the housing 76 and meshes with the gear 78 previously described. A pinion 84 is rotatably disposed on the shaft 80 adjacent the opposite end of the housing 76, and the pinion 84 meshes with the teeth formed on the periphery of the plate 45.

The pinion 79 is clutched to the shaft 77 when the solenoid C3 is energized; the pinion 84 is declutched from the shaft 80 when the solenoid C4 is energized. The shafts 77 and 82 will constantly rotate, but in opposite directions due to the intermeshing gears 78 and 83.

The electrical system of Figures 3 and 4 is the same as that for Figures 1 and 2 with the lines or leads 65 and 67 connected as illustrated.

Detailed operation

With the drive shaft rotating, the drive member 11 will rotate, and rotation will be imparted to the shaft 58 through the worm 61 and worm gear 60. Also, the shaft 51 will be rotating by the drive imparted through the gears 57 and 56. The directions of rotation are indicated in the drawings by appropriate arrows.

The switches 66 and 68 will be open, as illustrated, so that the clutch C1 is not engaged and the clutch C2 is engaged. Therefore, the gear 62 is clutched to the shaft 51 and drives the meshing gear 63, thereby rotating the shaft 64 and the pinion 63 in the opposite direction. The pinion 63, as previously explained, meshes with the teeth 48 formed on the periphery of the cam plate 45, so that the cam plate 45 will be rotated in the direction of the arrow identified by X.

Rotation of the cam plate in the X direction permits the balls 40 to ride down the inclined cam surfaces 39a, 39b and 39c and allows the plates 38 and 39 to move axially toward the left.

The plates 38 and 39 are resiliently urged axially toward the left by means of the springs 36 cooperating with the plungers 29; and button-like portions 39 reacting against the right face of the plate 39.

As previously explained, the plungers 29 are of different lengths, so that the portions 31 of the longest plungers, i. e., 29a and 29g will engage the plate 27 first, moving the plate 27 and the clutch ring 26 to the left and tending to pack the clutch plates 21 and 22 in frictional engagement. After the plungers 29a and 29g engage the plate 27, the plungers 29b and 29h engage the plate, these being the next in length; then the plungers 29l and 29f engage the plate 27; and finally the plungers 29c, 29d, 29e, 29i, 29j and 29k all engage the plate 27 at the same time these being all equal in length. As can be seen, the plungers 29 engage the plate 27 sequentially.

Since the work load from the drive shaft is extremely high, the previously described engagement of the plungers with the plate 27 to pack the clutch plates 21 and 22 in frictional engagement provides an initial slip to prevent the destruction of the driven means which would occur if the entire work load were impressed thereon instantaneously. As the rotational speed of the driven means increases and the plungers 29 are engaged, as described, the slip disappears and the clutch plates become fully, frictionally, engaged, so that the entire work load is impressed on the driven means.

Axial movement of the plate 39 to the right closes the microswitch 68, but until the switch 66 is closed, the electric circuit is not complete and nothing occurs.

To unpack the clutch plates 21 and 22 and break the driving connection between the drive means and the driven means, it is only necessary to close the switch 66, which completes the electric circuit.

When the switch 66 is closed, the clutch C2 will be disengaged, and as the microswitch 68 is closed, the clutch C1 will be engaged.

Disengagement of the clutch C2 allows the gear 63 to freely rotate on the shaft 51, so that no rotation will be imparted to the plate 45. Engagement of the clutch C1 clutches the pinion 49 to the shaft 51. Since the pinion 49 meshes with the teeth 48 formed on the periphery of the plate 45, the plate 45 will thus be rotated in the direction indicated by the arrow Y.

Rotation of the plate 45 in the Y direction causes the balls 40 to ride up the inclined cam surfaces 39a, 39b and 39c and moves the plates 38 and 39 axially toward the right, disengaging, in opposite sequence to that described for engagement, the plungers 29 from the plate 27, and allowing the clutch plates 21 and 22 to be free from their frictional engagement.

The movement of the plate 39 opens the microswitch 68 after a short period of time, the time being just sufficient to allow the balls 40 to be in their fully cammed position, as illustrated.

After the above, to connect the driven and drive means, it is only necessary to open the switch 66.

The second embodiment of my invention, illustrated in Figures 3 and 4 operates in a similar manner to that just described for the embodiment illustrated in Figures 1 and 2.

The shafts 77 and 80 will always be rotating when the drive shaft is rotating. With the switches 66 and 68 open, the pinion 84 will impart Y rotation to the plate 45, and the operation of the device is the same as previously described.

When the switches 66 and 68 are both closed, the former being moved by hand, and the latter being closed by movement of the plate 38, the pinion 79 will be clutched to the shaft 77 and impart rotation to the plate 45 to disconnect the driving connection between the drive and driven means in the same manner previously described.

The use of right or left to describe the various parts of my structure and the operation is merely to facilitate description and is not a limitation on the particular placement of my device.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. Clutch means comprising the combination of a drive member, a driven member, at least one friction plate connected to said drive member, at least one friction plate connected to said driven member, said plates being adapted to be packed in frictional engagement to rotatably connect said members, and means to apply an engaging force to said plates that varies in a predetermined sequence to provide an initial slipping engagement of said plates to a final full engagement of said plates, said means comprising a plurality of engaging elements, said engaging elements adapted to be operated sequentially to thereby apply said engaging force in said predetermined sequence.

2. In a friction clutch, the combination of a drive member and a driven member, a plurality of interleaved friction plates, alternate ones of said friction plates being connected to said drive member and the remainder being connected to said driven member, said friction plates being adapted to be packed in frictional engagement by the application of an engaging force thereto to rotatably connect said members, and means to apply said engaging force to said plates which varies from an initial force providing a slipping engagement thereof to a force that provides a full engagement thereof, said last-named means comprising a plurality of elongated engaging elements operatively associated with one of said members and being so constructed and arranged whereby said engaging elements operate sequentially to thereby apply said variable engaging force in a predetermined sequence.

3. In a friction clutch, the combination of a drive member and a driven member, a plurality of interleaved friction plates, alternate ones of said friction plates being connected to said drive member and the remainder being connected to said driven member, said friction plates being adapted to be packed in frictional engagement by the application of an engaging force thereto to rotatably connect said members, means to apply said engaging force to said plates which varies in a predetermined sequence from an initial force providing a slipping engagement thereof to a force that provides a full engagement thereof, said last-named means comprising a plurality of axially movable elongated engaging elements, resilient means urging said engaging elements toward their engaging positions, and cam means allowing said engaging elements to move to their engaging position sequentially to thereby apply said variable engaging force to said plates.

4. In a friction clutch, the combination of a drive member and a driven member, a plurality of interleaved friction plates, alternate ones of said friction plates being connected to said drive member and the remainder being connected to said driven member, said friction plates being adapted to be packed in frictional engagement by the application of an engaging force thereto to rotatably connect said members, means to apply an engaging force to said plates which varies from an initial force providing a slipping engagement thereof to a force that provides a full engagement thereof, said last-named means comprising a plurality of axially movable elongated engaging devices operatively associated with one of said members, resilient means urging said engaging devices toward their engaging positions, and cam means allowing said engaging devices to move toward their engaging positions sequentially to thereby apply said variable engaging force to said plates in a predetermined sequence and causing said engaging devices to move from their engaging positions.

5. In a friction clutch, the combination of a drive member and a driven member, a plurality of interleaved friction plates, alternate ones of said friction plates being connected to said drive member and the remainder being connected to said driven member, said friction plates being adapted to be packed in frictional engagement by the application of an engaging force thereto which varies in a predetermined sequence from an initial force providing a slipping engagement thereof to a force that provides a full engagement thereof to rotatably connect said members, means to apply said engaging force to said plates, means comprising a plurality of axially movable engaging plungers operatively associated with one of said members, said plungers being of different lengths, and being operated sequentially to thereby provide said variable engaging force, said plungers being resiliently urged toward engaging positions, and means so constructed and arranged to allow said plungers to move toward their engaging positions and causing said plungers to move from their engaging positions.

6. In a friction clutch, the combination of a drive member and a driven member, a plurality of interleaved friction plates, alternate ones of said friction plates being connected to said drive member and the remainder being connected to said driven member, said friction plates being adapted to be packed in frictional engagement by the application of an engaging force thereto to rotatably connect said members, means to apply an engaging force to said plates which varies from an initial force providing a slipping engagement thereof to a force that provides a full engagement thereof, said last-named means comprising a plurality of axially movable engaging plungers operatively associated with said driven member, said plungers being of different lengths, and being operated sequentially to thereby provide said variable engaging force, said plungers being resiliently urged toward their engaging positions, and cam means, said cam means comprising a pair of spaced members, one of said spaced members being operatively associated with said plungers and being axially movable to allow said plungers to move toward their engaging positions and causing said plungers to move from said engaging positions.

7. In a friction clutch, the combination of a drive member and a driven member, interleaved drive and driven friction plates connected respectively to said drive and driven members, said friction plates being adapted to be packed in frictional engagement by the application of forces thereto to rotatably connect said members, a plurality of axially movable plunger means said plunger means adapted to be operated in a predetermined sequence to thereby apply said engaging forces to said plates to provide an initial slipping engagement thereof and a final full engagement thereof, spring means operatively associated with said plunger means to resiliently urge said plunger means to their force applying positions, a thrust plate, an axially movable cam plate operatively associated with said plunger means, cam means on said cam plate, and at least one spherical means disposed between said cam plate and said thrust plate and adapted to cooperate with said cam means to allow axial movement of said cam plate and thereby allow engagement of said plunger means.

8. In a friction clutch, the combination of a drive member and a driven member, interleaved drive and driven friction plates connected respectively to said drive and driven members, said friction plates being adapted to be packed in frictional engagement by the application of forces thereto to rotatably connect said members, a plurality of axially movable plunger means, said plunger means adapted to be operated in a predetermined sequence to thereby apply said engaging forces to said plates to provide an initial slipping engagement thereof and a final full engagement thereof, spring means operatively associated with said plunger means to resiliently urge said plunger means to their force applying positions, a rotatable thrust plate, an axially movable cam plate operatively associated with said plunger means, cam means on said cam plate, at least one spherical means disposed between said cam plate and said thrust plate, and means associated with said thrust plate adapted to rotate said thrust plate and cause said spherical means to cooperate with said cam means to provide movement of said cam plate and thereby allow said plungers to move to their engaging positions in said predetermined sequence and cause movement thereof from their engaging positions.

9. In a friction clutch, the combination of a drive member and a driven member, interleaved drive and driven friction plates connected respectively to said drive and driven members, said friction plates being adapted to be packed in frictional engagement by the application of forces thereto to rotatably connect said members, a plurality of axially movable plunger means, said plunger means adapted to be operated in a predetermined sequence to thereby apply said engaging forces to said plates to provide an initial slipping engagement thereof and a final full engagement thereof, spring means operatively associated with said plunger means to resiliently urge said plunger means to their force applying positions, a rotatable thrust plate, an axially movable cam plate operatively associated with said plunger means, cam means on said cam plate, at least one spherical means disposed between said cam plate and said thrust plate, and means associated with said thrust plate adapted to rotate said thrust plate and cause said spherical means to cooperate with said cam means to provide movement of said cam plate and thereby allow said plungers to move to their engaging positions in said predetermined sequence and cause movement thereof from their engaging positions, said means associated with said thrust plate including at least one auxiliary clutch means.

10. In a friction clutch, the combination of a drive member and a driven member, interleaved drive and driven friction plates connected respectively to said drive and driven members, said friction plates being adapted to be packed in frictional engagement by the application of forces thereto to rotatably connect said members, a plurality of axially movable plunger means, said plunger means adapted to be operated in a predetermined sequence to thereby apply said engaging forces to said plates to provide an initial slipping engagement thereof and a final full engagement thereof, spring means operatively associated with said plunger means to resiliently urge said plunger means to their force applying positions, a rotatable thrust plate, an axially movable cam plate operatively associated with said plunger means and said spring means, cam means on said cam plate, at least one spherical means disposed between said cam plate and said thrust plate, and means associated with said thrust plate adapted to rotate said thrust plate and cause said spherical means to cooperate with said cam means to provide movement of said cam plate and thereby allow said plungers to move to their engaging positions in said predetermined sequence and cause movement thereof from their engaging positions, said means associated with said thrust plate including at least one solenoid-operated auxiliary clutch means.

11. In a friction clutch, the combination of a drive member and driven member, interleaved drive and driven friction plates connected respectively to said drive and driven members, said friction plates being adapted to be packed in frictional engagement by the application of forces thereto to rotatably connect said members, a plurality of axially movable plunger means, said plunger means adapted to be operated in sequence to thereby apply said engaging forces to said plates to provide an initial slipping engagement thereof and a final full engagement thereof, spring means operatively associated with said plunger means to resiliently urge said plunger means to their force applying positions, a rotatable externally toothed thrust plate, an axially movable cam plate operatively associated with said plunger means and said spring means, cam means on said cam plate, at least one spherical means disposed between said cam plate, and means associated with said thrust plate adapted to rotate said thrust plate and cause said spherical means to cooperate with said cam means to provide movement of said cam plate and thereby allow said plungers to move to their engaging positions in said predetermined sequence and cause movement thereof from their engaging positions, said means associated with said thrust plate including at least one solenoid-operated auxiliary clutch means and gear means driven by said drive member and operatively associated with said auxiliary clutch means and said thrust plate to cause rotation of the latter.

12. In a friction clutch, the combination of a drive member and a driven member, interleaved drive and driven friction plates connected respectively to said drive and driven members, said friction plates being adapted to be packed in frictional engagement by the application of forces thereto to rotatably connect said members, a plurality of axially movable plunger means adapted to apply said engaging forces to said plates to provide an initial slipping engagement thereof and a final full engagement thereof, said plunger means comprising a plurality of different lengthed elements so constructed and arranged whereby said plunger means operates sequentially to thereby apply said engaging forces in a predetermined sequence, spring means operatively associated with said plunger means to resiliently urge said plunger means to their force applying positions, a rotatable thrust plate, an axially movable cam plate operatively associated with said plunger means and said spring means, cam means on said cam plate, at least one spherical means disposed between said cam plate and said thrust plate, means associated with said thrust plate adapted to rotate said thrust plate and cause said spherical means to cooperate with said cam means to provide movement of said cam plate and thereby allow said plungers to move to their engaging positions in said predetermined sequence and cause movement thereof from their engaging positions.

References Cited in the file of this patent

UNITED STATES PATENTS

| | | |
|---|---|---|
| 745,763 | Barlow | Dec. 1, 1903 |
| 1,323,727 | Streich | Dec. 2, 1919 |
| 2,722,301 | Francois | Nov. 1, 1955 |